Jan. 10, 1933.  J. B. HENDERSON  1,894,038
GYROSCOPIC STEERING INDICATOR OR CONTROLLER
Filed July 26, 1919  3 Sheets-Sheet 1
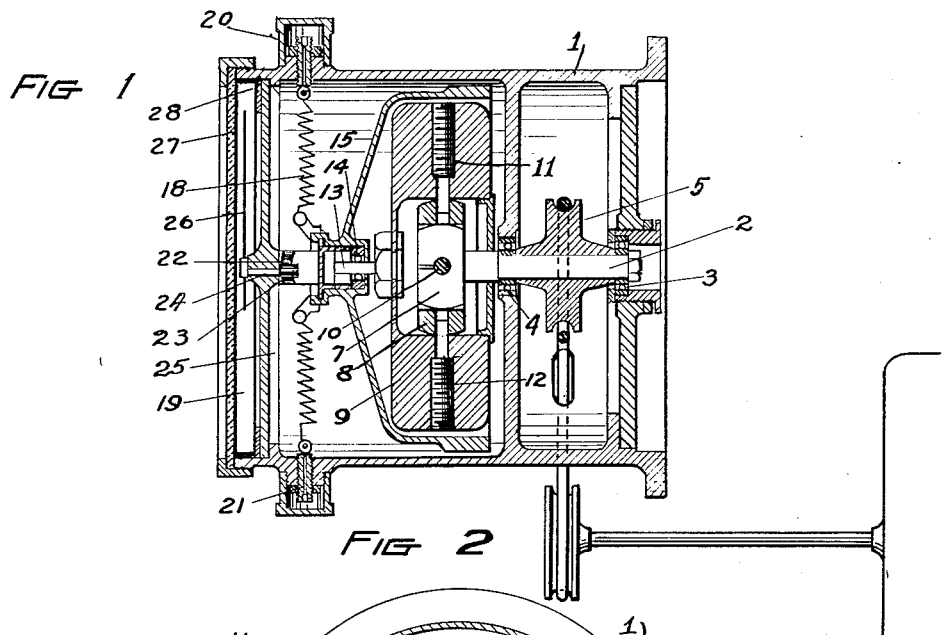
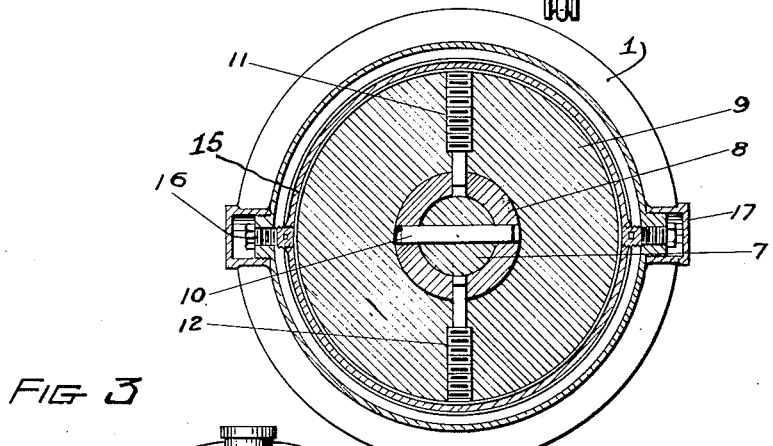
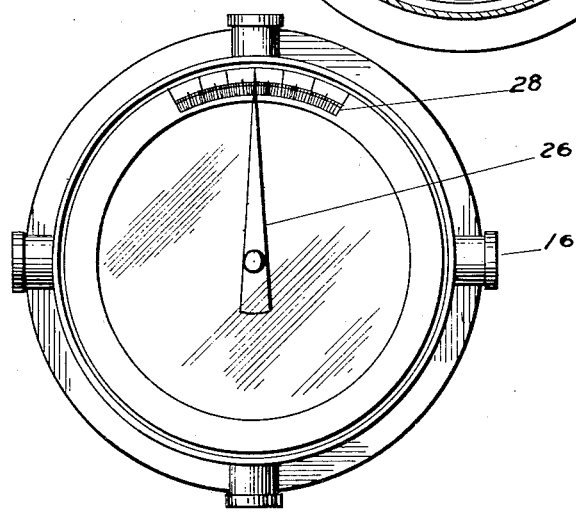
INVENTOR
James B Henderson
by
Henry Moakley
Attorney Jan. 10, 1933.   J. B. HENDERSON   1,894,038
GYROSCOPIC STEERING INDICATOR OR CONTROLLER
Filed July 26, 1919   3 Sheets-Sheet 2
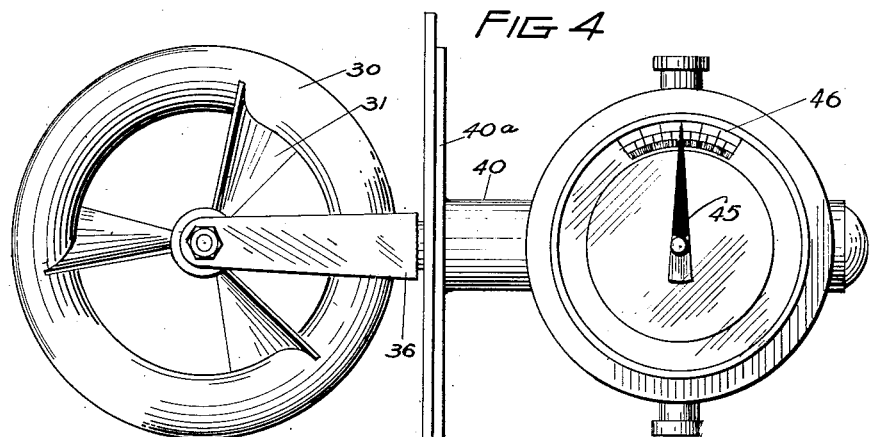
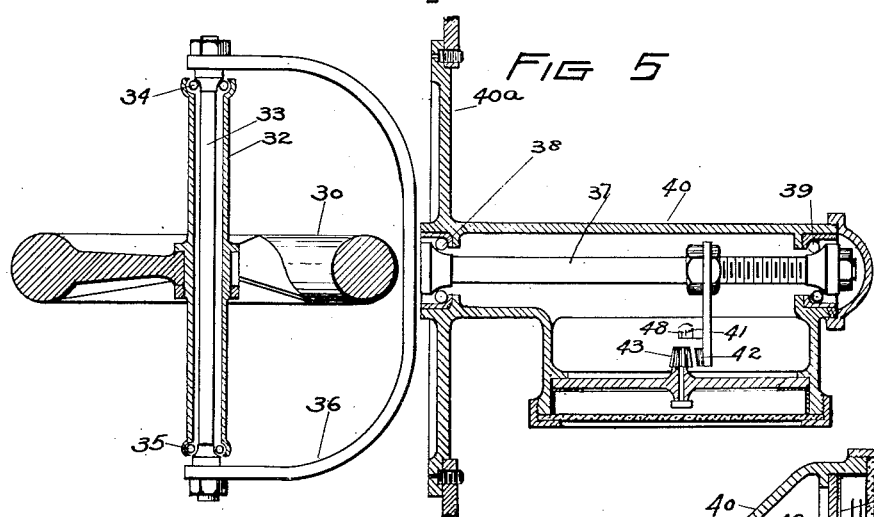
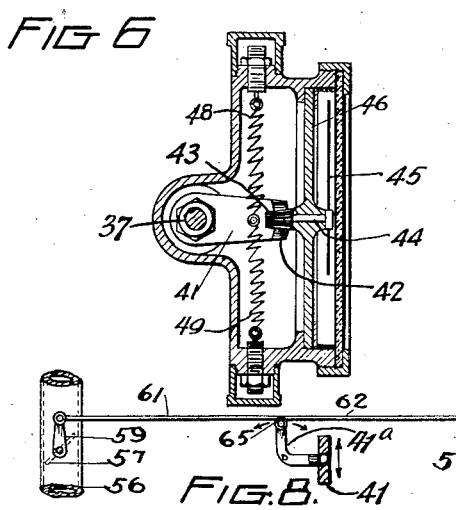
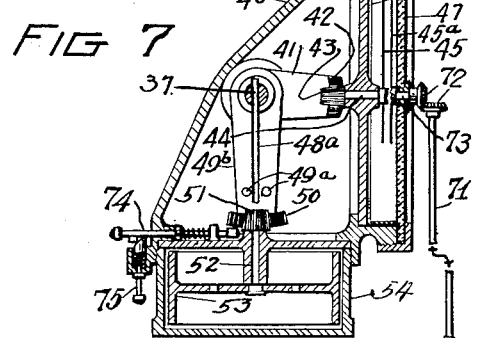
INVENTOR
James B. Henderson
by
Henry Moakley
attorney Jan. 10, 1933.  J. B. HENDERSON  1,894,038
GYROSCOPIC STEERING INDICATOR OR CONTROLLER
Filed July 26, 1919   3 Sheets-Sheet 3
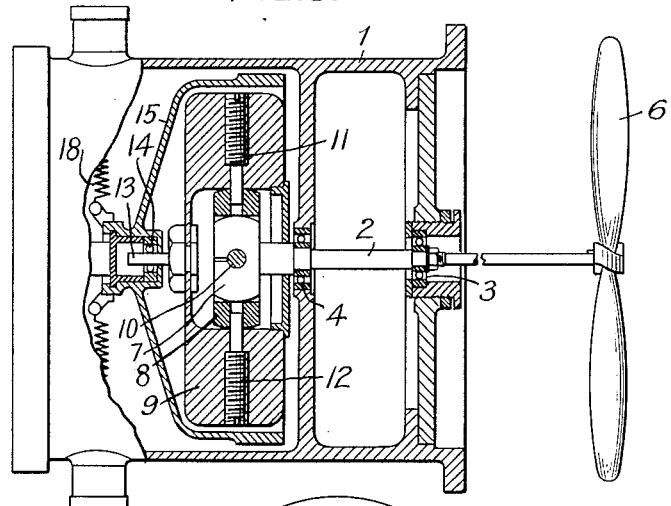
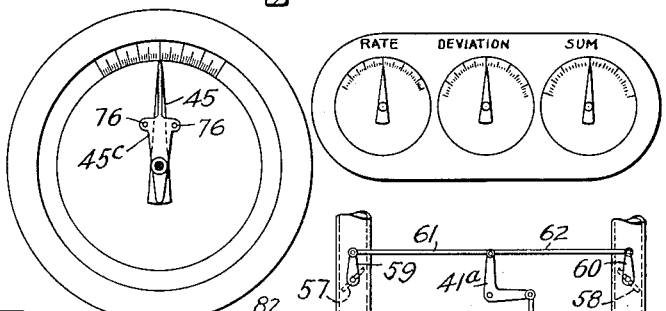
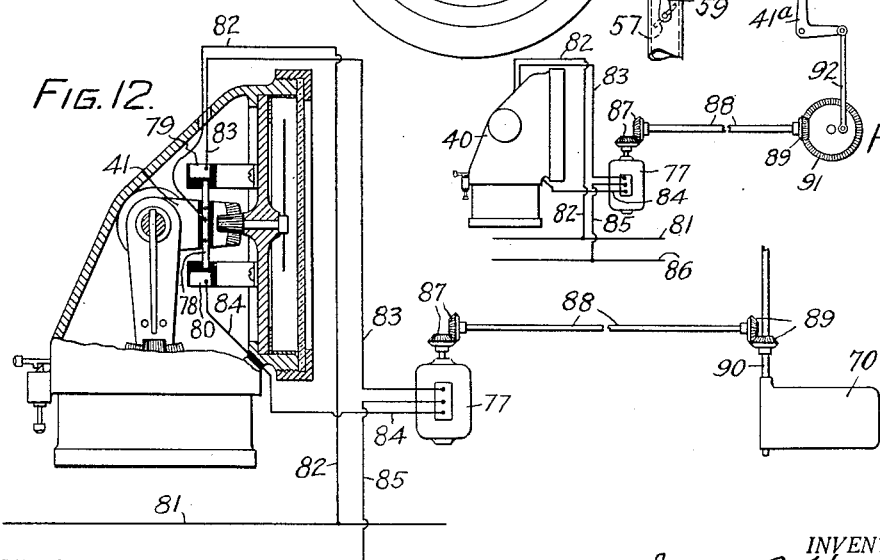
INVENTOR.
James B. Henderson,
BY Moakley & Gill
ATTORNEYS.

Patented Jan. 10, 1933

1,894,038

UNITED STATES PATENT OFFICE

JAMES BLACKLOCK HENDERSON, OF LEE, ENGLAND

GYROSCOPIC STEERING INDICATOR OR CONTROLLER

Application filed July 26, 1919, Serial No. 313,530, and in Great Britain August 6, 1918.

My invention relates to gyroscopic apparatus for indicating or controlling a change of course or the rate of change of course or both, of the type described in my copending application Serial No. 171,319, filed May 26, 1917, and more particularly to improvements in the apparatus to adapt it more readily for use in aircraft.

The magnetic compass is only reliable as an indicator of course on an aeroplane in the absence of "banking" because of the large deviation of the compass then produced by the action of magnetic dip. If, however, the aeroplane be fitted with an indicator which shows the rate of change of course, the pilot when flying through clouds, will then know if he is banking and also how to steer to correct it, and in the absence of banking he can rely on the compass as an indicator of the course relatively to the magnetic meridian.

If a pilot were to follow with his steering wheel or tiller, the deflection of the pointer of a "turn indicator", which indicates the rate of turning or the radius of the turning circle, moving his wheel so as to check the turn, the plane or ship would follow a zig-zag course.

Similarly if he follows with his tiller the indications of the compass i. e. the deviations from the course, the aeroplane or ship would also follow a continuous zig-zag course. To produce stable steering a certain amount of conscious anticipation is required on the part of the pilot in moving his tiller so as to check the swing of the aeroplane or ship when approaching the course it is intended to follow.

The helmsman in a ship acquires the art of applying check helm by practice and the same is true of the pilot of an aeroplane. But in both cases it is desirable if possible to give to the steersman or pilot an instrument so arranged that if he follows the indications of the pointer with his tiller, say by a follow the pointer mechanism, the check helm and anticipation will be done automatically for him. The motion of the pointer of such an instrument if imparted to the tiller automatically by a servo-motor will then control the steering automatically. Such an instrument is described in the application referred to above, which indicates not only the rate of turn but also the deviation from the course and also the sum of the two. The sum of the two is the proper indication required for a steering indicator which is to eliminate the skill of the trained helmsman or pilot and which must control the servo-motor in automatic steering.

When a ship or aeroplane gets a deviation $\theta$ from her course, the return to her course ought to be in the nature of a damped oscillation the equation of which is $\theta'' + a\theta' + b\theta = 0$ in which $\theta''$ represents the acceleration or helm displacement, $a\theta'$ the rate of turning of the craft or rate of yaw, and $b\theta$ the angular displacement or yaw, $a$ and $b$ being constants. The couple applied by the helm to the ship must therefore be proportional to $a\theta' + b\theta$ and it is the skill in applying these two separate components, one proportional to the deviation and the other to the rate of turning, which makes the difference between a good steersman and a bad one. By employing the indicator described in my previous application above referred to the skill is eliminated and with the automatic controller the need for the constant attention of the helmsman or pilot is eliminated.

The object of my present invention is to improve and simplify the indicator or controller described in the application mentioned above in its adaption for aircraft. The improvements consist in driving the flywheel of the gyroscope from the engine or propeller shaft or by a small screw propeller and also in employing the controller to control directly the relative supply of fuel to two engines in a multiple engined aeroplane, thereby controlling the course preferably without the intervention of a servo-motor.

Fig. 1 shows a sectional elevation of one arrangement of the course indicator or controller.

Fig. 2 is a cross sectional elevation through the rotor mounting.

Fig. 3 is a front elevation.

Fig. 4 is a front elevation of another arrangement in which the screw propeller forms the spokes of the flywheel rotor.

Fig. 5 is a sectional plan.

Fig. 6 is a sectional elevation through the indicator dial.

Fig. 7 corresponds to Fig. 6 but shows the arrangement in which the pointer indicates the sum of the deviation from the course and the rate of change of that deviation.

Fig. 8 shows the method of connecting the controller to control the course by restricting the supply of fuel to one or other of two or more engines driving an aeroplane or ship.

Fig. 9 is a view showing the instrument of Fig. 1 as having its gyroscopic rotor driven by a screw propeller.

Fig. 10 is a face view of an instrument having a following pointer provided with stops for association with a followed pointer.

Fig. 11 is a fragmentary view indicating the use of a plurality of individual scales on the readable dial.

Fig. 12 is a view of an instrument like that of Fig. 7, except that it shows, diagrammatically, the use of a servo-motor for automatically steering the tiller.

Fig. 13 is another view similar to Fig. 12, but showing the valves of a multiple engine aeroplane under the control of a servo-motor.

Figs. 1 and 2 show two sectional elevations of one arrangement I employ for driving the gyroscope by belt from the engine or by a small aero-screw propeller.

The case 1 of the instrument carries the shaft 2 on ball bearings 3 and 4. This shaft is driven by a belt on the pulley 5 or by an air-screw 6 keyed on a prolongation of the shaft, as shown in Fig. 9, or the air-screw may be connected to the shaft 2 by belt or toothed gearing in the manner suggested by Fig. 1. This screw 6 is shown on a reduced scale.

The shaft 2 carries on its other end a universal joint the centre portion 7 of which is solid with the shaft, and is connected to the intermediate ring 8 of the joint by the pivotal pin 10. The outer member 9 of the joint forms the flywheel of the gyroscope and is pivoted on the ring 8 by the two pivot pins 11 and 12.

The flywheel 9 carries the small axial shaft 13 which rotates with the flywheel. This shaft turns in a ball bearing 14 fixed to a frame 15 which is pivoted on two horizontal trunnions 16 and 17 the axes of which pass through the centre of the Hooke's joint, the trunnions being screwed through the outer case 1. The flywheel is therefore free to pitch about the trunnion axes 16—17, but is constrained in the horizontal plane so that it must yaw with the case 1.

The pitching motion of the frame 15 is constrained by two springs 18 and 19, the inner ends of which are attached to eyes on the frame and the outer ends to two adjusting screws 20 and 21 screwed through the outer case.

The pitching motion of the frame 15 is transmitted through the toothed segment 22 gearing with the pinion 23 on the pointer shaft 24 to the pointer 26 which indicates on the scale 28. The face of the dial is covered by the glass plate 27.

The deflection indicated by the pointer 26 on the scale 28 (Fig. 3) is proportional to the rate of turning if the speed of the gyro is kept constant, but if the screw propeller driving the gyro is large enough to make the gyro speed follow the fluctuations of the air speed of the aeroplane immediately then the deflection of the pointer is proportional to the radius of the turning circle and the scale may be graduated accordingly. Such an instrument would be a turn-indicator.

Figs. 4 and 5 show an alternative arrangement of the gyro which I may use when it is not necessary to maintain a very uniform speed of gyro or a speed proportional to the air-speed of the aeroplane. In this case the arrangement of the gyro is similar to that of the front wheel of a bicycle and the air-screw propeller blades form the spokes of the wheel. The gyro flywheel has a rim 30 the spokes 31 of which are helical in form like the blades of a screw propeller. The flywheel is fixed on the short hollow shaft 32 which is pivoted on the spindle 33 on the ball bearings 34 and 35. The spindle 33 is carried by the fork 36 which is pivotally mounted in the casing 40 by being rigidly attached to the spindle 37 carried by the ball bearings 38 and 39. The casing 40 is attached to the side of the nacelle of the aeroplane by the flange 40a, so that the flywheel is outside exposed to the rush of air past the aeroplane and the casing 40 containing the indicating mechanism is inside.

The spindle 37 carries a crank 41 which is constrained relatively to the casing 40 by two springs 48 and 49 as is illustrated in Fig. 6. This crank also carries the toothed sector 42 which gears with the pinion 43 attached to the pointer spindle 44. The pointer 45 thus indicates on the scale 46 the pitching motion of the gyro. This instrument would indicate only the rate of turning.

To make a true steering indicator I employ a modified arrangement like that shown in Fig. 7, which is a modification of Fig. 6. The spindle 37 in this modification carries the horizontal crank 41 which actuates the pointer just as in Fig. 6, but this crank is not now constrained by the two helical springs. It is constrained by a cantilever spring 48a which is rigidly attached at one end to the spindle 37 and at the other end passes between two pins 49a on a crank 49b which is pivoted on the spindle 37 so that it can turn relatively to that spindle. The crank 49b carries the toothed sector 50 gearing with the pinion 51, which turns the cylindrical member 53 through its rod 52 in the cylindrical box 54. The member does not fit the box and the small space between them is filled with viscous fluid. Hence the anchorage of the spring controlling the pitching of the gyro, instead of being the rigid case of the instrument, is in this arrangement the crank 49b which turns slowly under the action of the spring force with a speed proportional to that force. The deflection of the crank 49b is therefore the integral of the spring force and is proportional to the alteration of course.

The deflection of the pointer 45 is thus the sum $a\theta + b\theta$ and if the tiller be moved in phase with this pointer, say by means of a follow the pointer mechanism (that is by having another pointer 45a in front of the pointer 45 geared to the tiller), then I arrange the linkage so that, if the tiller 70 is moved to drive through shafts 71, gears 72 and the shaft 73, so as to keep the two pointers together, the aeroplane will be properly steered. An occasional glance at the compass card will suffice to indicate any slow change of course. When bringing about a change of course intentionally I lock the member 53 in the cylinder 54 temporarily by a suitable mechanism, such as is shown in Fig. 7, comprising a normally retracted spring-pressed latch 74 co-acting with a spring-pressed locking latch 75. The latch 74 may be pushed into mesh with the pinion 51, and released therefrom by pulling the latch 75 into an unlocking position. As an alternative, I provide stops 76, shown in Fig. 10, which are attached to the following pointer 45c, which limit the motion of the pointer 45 relatively to it so that after the relative deflection reaches a certain magnitude the pointer 45 is forced to follow the other pointer which moves with the tiller.

I may provide separate scales in the instrument to read the rate of turning, the deviation from the course and the sum of the two, as indicated in Fig. 11.

To control the steering of an aeroplane or airship automatically I transmit the motion of the crank 41 in Fig. 7 to the tiller 70, as shown in Fig. 12, through a servo-motor 77 of suitable type. Under these circumstances, I mount a contact 78 fixedly on the crank 41, so that as this crank oscillates it will engage with either a contact 79 or a contact 80. In either case current will flow from a line conductor 81 and a conductor 82 to the oscillating contact 78, thence going either by a conductor 83 or 84, as the case may be, to the servo-motor 77, the current returning by a conductor 85 to the opposite line conductor 86. Accordingly, the servo-motor 77 will operate gears 87, a shaft 88, gears 89 and a shaft 90, to turn the tiller 70 in one direction or the other, depending upon the direction of movement of the crank 41. In the case of multiple engined planes, however, I may transmit the motion to throttle levers in two of the engines so that motion of the crank 41 up or down throttles the one or the other engine, directly or otherwise restricts the supply of fuel, say by delaying the time of closing of the suction valves of the fuel pumps. If the forces required to move the throttles or to control the suction valves are small compared with the gyroscopic forces actuating the crank 41, the control may be made directly without the intervention of a servo-motor, otherwise a servo-motor 77 would be used, as indicated in Fig. 13, wherein an instrument like that of Fig. 7 controls the servo-motor, which in turn drives a bevel gear 91 which through a rod 92 actuates valves in an arrangement similar to that shown in Fig. 8.

Fig. 8 shows a diagrammatic arrangement of links which I may employ between the crank 41 and, say, two throttle valves. The two throttles valves 57 and 58 in the induction pipes 55 and 56 of the two engines are controlled by the two cranks 59 and 60 which are connected to the vertical crank 41a, compound with the horizontal crank 41 of the instrument, by the connecting rods 61 and 62 which connect the crank pins 63 and 64 with the crank pin 65. The throttle valves are inclined to the cranks so as both to be partially closed so that as the crank 41 rises or falls one or other of the two engines is throttled. The particular type of fuel control employed would naturally depend upon the type of fuel feed fitted to the engines and suitable modifications would be made accordingly.

Having now particularly described and ascertained the nature of my said invention and in what manner the same is to be performed, I declare that what I claim is:—

1. The combination with a craft provided with a propelling engine, of a gyroscopic indicator comprising a rotor having a spinning axis and an axis at an angle thereto about which said rotor is mounted to oscillate, means for continuously driving said rotor from the engine of the craft, an indicating member, and an operating connection between said rotor and member responsive to oscillation of the former in consequence of movement of said craft about an axis perpendicular to said other axes.

2. The combination with a dirigible craft of a gyroscopic steering indicator comprising a rotor mounted to oscillate about an axis normally in fixed relation to the craft to lie substantially in the plane of travel thereof, means for continuously driving the rotor in proportion to the speed of the craft, an indicating member, and means actuated by relative displacement between the rotor and the craft, for displacing the member in accordance with changes of movement of the craft about an axis substantially perpendicular to the first-mentioned axis.

3. The combination with a dirigible craft, of a gyroscopic steering indicator comprising a rotor mounted for oscillation about an axis normally fixed in relation to the craft to lie substantially in the plane of travel thereof, means for continuously driving the rotor by the movement of the craft, an indicating member, and means actuated by relative displacement between the rotor and the craft for displacing the member in accordance with changes in movement of the craft about an axis substantially perpendicular to the first-mentioned axes.

4. The combination with a craft provided with a propelling engine of a gyroscopic steering indicator comprising a rotor mounted for oscillation about an axis normally fixed in relation to the craft to lie substantially in the plane of travel thereof, driving connections between the engine and the rotor continuously operable while the engine is propelling the craft, an indicating member, and means actuated by relative displacement between the rotor and the craft for displaceing the member in accordance with changes in the movement of the craft about an axis substantially perpendicular to the first-mentioned axis.

5. The combination with a dirigible craft, of a gyroscopic steering indicator comprising a flywheel mounted for oscillation about an axis normally fixed in relation to the craft to lie substantially in the plane of travel thereof, a shaft, a universal joint connection between the flywheel and the shaft, means for driving the shaft, an indicating member, and means actuated by relative displacement between the flywheel and the craft for displacing the member in accordance with changes in the movement of the craft about an axis substantially perpendicular to the first-mentioned axis.

6. The combination with a dirigible craft, of a gyroscopic steering indicator comprising a flywheel mounted for oscillation about an axis normally fixed in relation to the craft to lie substantially in the plane of travel thereof, said flywheel being provided with a recess, a shaft entering the recess, a universal joint connection between the flywheel and the shaft within the flywheel mounting the latter for precessional movement, means associated with the shaft for rotating it by the movement of the craft, an indicating member, and means actuated by relative displacement between the flywheel and the craft for displacing the member in accordance with changes in movement of the craft about an axis substantially perpendicular to the first-mentioned axis.

7. The combination with a dirigible craft, of a gyroscopic steering indicator comprising a casing fixed to the craft, a rotor mounted in the casing to oscillate about an axis fixed in relation to the craft to lie substantially in the plane of travel thereof and perpendicularly to the direction of the travel of the craft, means for driving the rotor by movement of the craft, a member connected to the rotor and movably mounted in the casing, means for constraining the movement of the member, and means for indicating the displacement of the member with respect to the casing, said last named means being disposed in planes parallel to the direction of the axis about which the rotor oscillates.

8. A gyroscopic steering indicator comprising a casing, a shaft mounted in the casing, a rotor member, a universal joint connection between the shaft and the rotor member, a shaft associated with the rotor member, a frame connected to the shaft and pivotally mounted upon the casing, means for constraining the movement of the frame and means for indicating the displacement of the frame with respect to the casing.

9. In a turn indicator for dirigible vehicles, a gyroscope mounted for precession about an axis at an angle to the vertical in response to turning of the vehicle in azimuth, and a plurality of springs connected with said gyroscope and longitudinally in line with each other and with the axis of rotation of said gyroscope each of which springs opposes precession of said gyroscope about said axis in each direction.

10. In a turn indicator for aircraft, a frame, a support, pivots connecting said frame and said support for permitting movement of said frame about an axis at an angle to the vertical, a rotor mounted in said frame for rotation about another axis that is fixed with respect to said support, a spring connected to said frame adjacent one of said pivots for opposing movement of said frame in either of opposite directions about said axis and means for adjusting the tension of said spring at will.

11. In a turn indicator for aircraft, a frame, a support, pivots connecting said frame and said support for permitting movement of said frame about an axis, at an angle to the vertical, a rotor mounted in said frame for rotation about another axis that is fixed with respect to said support, and a spring connected to said frame adjacent one of said pivots for opposing movement of said frame in either of opposite directions about said axis.

12. In a turn indicator for dirigible vehicles, a gyroscope mounted for precession about an axis at an angle to the vertical, a casing enclosing said gyroscope, yielding means in said casing for opposing said precession, and means comprising a longitudinally displaceable rotatable member for altering at will the resistance offered by said yielding means to said precession, said member being operable from the exterior of said casing.

13. In a turn indicator for dirigible vehicles, a gyroscope mounted for precession about an axis at an angle to the vertical, a casing enclosing said gyroscope, yielding means for opposing said precession, means comprising a rotatable member for altering at will the resistance offered by said yielding means to said precession, said member being operable from the exterior of said casing, and a rate of turn indicator associated with said gyroscope.

14. In a flying indicator adapted to be mounted on an aircraft which banks on turning, a part adapted to be fixed on the aircraft, a gyroscope having a rotor directly mounted on said part for precession on said craft at an angle to the vertical, means for opposing said precession and an index for indicating the apparent movements of the gyroscope with respect to said fixed part.

15. In a flying indicator adapted to be mounted on an aircraft which banks on turning, a part adapted to be fixed on the aircraft, a gyroscope mounted on said part for precession on said craft at an angle to the vertical, a driven shaft for driving said gyroscope, means for opposing said precession responsive to the azimuthal rate of turn of said craft and an index for indicating the apparent movements of the gyroscope with respect to said fixed part.

16. In a flying indicator adapted to be mounted on an aircraft which banks on turning, a part adapted to be fixed on the aircraft, a gyroscope having a spinning axis and a supporting shaft, said gyroscope being mounted on said part for precession on said craft at an angle to the vertical, means for opposing said precession, an index for indicating the apparent movements of the gyroscope with respect to said fixed part, and another shaft coincident with said spinning axis and responsive to the precessional movement of the gyroscope to actuate said index.

17. In a flying indicator adapted to be mounted on an aircraft, a part adapted to be fixed to an aircraft, a movable index mounted thereon, an actuator for said index consisting of a device pivotally mounted on said part, means for moving said device proportionately to angular velocity of the craft about a normally vertical axis comprising a gyroscope mounted for precession and connected to said device, a shaft for driving said gyroscope, and a universal mounting supporting said gyroscope on said shaft, and means responsive to said angular velocity for opposing said actuator.

Dated this fifteenth day of July, 1919.

JAMES BLACKLOCK HENDERSON.